United States Patent [19]
Dix et al.

[11] Patent Number: 5,668,728
[45] Date of Patent: Sep. 16, 1997

[54] REMOVABLE DEFLECTORS FOR BWR FUEL WITH STEAM VENTS AND PART-LENGTH RODS

[75] Inventors: Gary E. Dix, Saratoga; Bruce Matzner, San Jose, both of Calif.

[73] Assignee: General Electric Company, Schenectady, N.Y.

[21] Appl. No.: 551,770

[22] Filed: Nov. 7, 1995

[51] Int. Cl.$^6$ .................................................. G21C 3/322
[52] U.S. Cl. ............................................................ 376/443
[58] Field of Search ........................... 376/443, 439, 376/435, 446

[56] References Cited

U.S. PATENT DOCUMENTS

| | | | |
|---|---|---|---|
| 3,844,888 | 10/1974 | Calvin | 376/439 |
| 5,017,332 | 5/1991 | Dix et al. | 376/443 |
| 5,091,146 | 2/1992 | Dix | 376/435 |
| 5,416,812 | 5/1995 | Matzner | 376/443 |
| 5,491,733 | 2/1996 | Patterson et al. | 376/443 |

*Primary Examiner*—Daniel D. Wasil
*Attorney, Agent, or Firm*—Nixon & Vanderhye

[57] ABSTRACT

A deflector is disposed in a steam vent region above the upper ends of part-length fuel rods to deflect upwardly flowing liquid laterally outwardly into the interstices of the full-length fuel rods adjacent the steam vent region. The deflector is supported by a spacer or from the upper tie plate and can be removed from the fuel bundle for access to the part-length fuel rods. The deflector may comprise a flat plate, an inverted pyramid, an inverted cone, a multi-sided pyramidal configuration or a swirl device wherein the horizontally projected area of the deflector is substantially coextensive with the horizontal cross-sectional area of the steam vent area. In this manner, a higher density liquid is provided in the interstices of the full-length rods while the lower density steam flows into the steam vent volume for flow upwardly out of the fuel bundle.

14 Claims, 9 Drawing Sheets

REMOVABLE DEFLECTORS FOR BWR FUEL WITH STEAM VENTS AND PART-LENGTH RODS

TECHNICAL FIELD

The present invention relates in general to the steam vent region above the upper ends of part-length fuel rods in a nuclear fuel bundle and particularly relates to deflectors disposed above the part-length rods enabling improved thermal hydraulic performance in the upper regions of the fuel bundle and facilitating removal of the part-length fuel rods.

BACKGROUND

In a boiling water nuclear reactor, a plurality of nuclear fuel bundles are provided, each including a matrix of upstanding fuel rods. Each fuel rod contains a substantial number of stacked, cylindrical pellets of enriched uranium, the fuel rods being sealed at opposite ends. The fuel rods of each bundle are supported on a lower tie plate and extend upwardly from the lower tie plate to an upper tie plate. The fuel bundle is thus defined by a lattice of rows and columns of vertically extending, generally parallel, laterally spaced fuel rods. In addition to supporting the fuel rods, the lower tie plate permits entry of coolant/moderator water within the fuel bundle. The upper tie plate maintains the matrix of fuel rods upright from the lower tie plate and permits the discharge of heated water and generated steam from the interior of the fuel bundle. The fuel bundle also includes spacers, for example, seven such spacers, spaced along the length of the fuel bundle. The spacers serve to maintain the fuel rods laterally spaced from one another and are disposed at intervals along the lengths of the fuel rods. A channel surrounds each fuel bundle and extends from the lower tie plate to the upper tie plate. The channel confines the water flow from the lower tie plate to the upper tie plate. The fuel bundles are positioned in the reactor core between a lower core plate and an overlying top guide.

In operation, water enters each fuel bundle through its lower tie plate. The water acts both as a coolant and a moderator. As a coolant, the water is heated and evolves to steam by heat exchange with the fuel rods. As a moderator, fast neutrons from the nuclear reaction are moderated and become slow-moving or thermal neutrons to continue the chain reaction within the fuel bundle. As the water is heated, the bundles have increasing fractions of steam in the upper two-phase portion of the fuel bundle.

It has been found beneficial to provide a plurality of less than full-length fuel rods in the nuclear fuel bundle and these rods are called part-length fuel rods. These part-length fuel rods are supported on a lower tie plate and extend upwardly toward the upper tie plate, terminating short of the upper tie plate in or just above one of the upper spacers, for example, the fifth or sixth spacer. Thus, a vent volume is defined between the upper tie plate and the upper ends of the part-length fuel rods. It is known to provide in this vent volume a steam vent tube and liquid deflector. See, for example, U.S. Pat. No. 5,091,146, of common assignee herewith. The steam vent tube and liquid deflector of that patent was not provided with capability for removal to provide access to the underlying pad-length fuel rods.

DISCLOSURE OF THE INVENTION

According to the present invention, there is provided in a nuclear fuel bundle of the foregoing-described type a deflector for disposition in the volume above the part-length fuel rods for improving thermal hydraulic performance, while maintaining nuclear performance, and simultaneously facilitating removal of the part-length fuel rods. To accomplish this, a deflector is disposed across the steam vent region above the upper end of the part-length rods. As a consequence, all of the water flowing upwardly between the part-length rods is diverted away from the steam vent region into the interstices of the full-length rod region. The more dense liquid tends to remain in the interstices of the full-length rods, while the lighter, more mobile vapor moves toward the open steam vent region above the deflector. As a result, the upper two-phase region of the fuel assembly which contains the full-length fuel rods has a beneficially reduced void fraction and improved critical power limits.

The deflector may take various forms in accordance with the present invention. For example, a flat plate overlying the upper ends of the part-length fuel rods may be used. A flat plate, however, causes significant pressure drop and is therefore not an optimum choice. An inverted pyramidal-shaped or cone-shaped deflector is preferable. The inverted pyramid may comprise four sides in alignment with the rectilinear sides of the steam vent whereby water is deflected laterally outwardly from its four sides into the interstices of the full-length fuel rods. The pyramid may also be rotated about its axis approximately 45° so that the upwardly flowing liquid will be deflected toward the corners of the rectilinear vent volume. It will be appreciated that an inverted cone may likewise be used. An inverted cone has the advantage of affording uniformity of flow distribution issuing from the part-length rod region. The advantages of a cone-shaped deflector can be approximated by a pyramid having additional sides, for example, eight sides, whereby an approximate uniform laterally outward flow distribution is afforded. A swirl deflector may likewise be used. The swirl deflector can produce a vortex downstream of the deflector which will continue to separate liquid out of the steam vent path. The deflector may be releasably attached within the fuel bundle to the spacer or can be located above the spacer on a structural rod or rods depending from the upper tie plate for easy removal of the deflector through the upper end of the fuel bundle. In a further form hereof, the deflector may have openings for receiving the upper ends of the part-length fuel rods or at least the end plugs thereof.

In a preferred embodiment according to the present invention, there is provided a fuel bundle for boiling water reactors comprising a plurality of vertically aligned, spaced-apart fuel rods within the fuel bundle for generation of a fission reaction in the presence of water moderator, a lower tie plate for admitting water moderator through the lower tie plate to the interstices of the fuel rods and supporting the vertically aligned, spaced-apart fuel rods, an upper tie plate for enabling water and steam to be discharged from the top of the fuel bundle and maintaining the vertically aligned, spaced-apart fuel rods in upstanding, spaced-apart, side-by-side relation, a surrounding fuel channel for confining moderator flow along the fuel rods and from the lower tie plate to the upper tie plate, at least one of the fuel rods being a pad-length rod extending vertically from the lower tie plate and terminating shod of the upper tie plate wherein the upper end of the one part-length rod defines with respect to the surrounding fuel rods a volume overlying the part-length rods under the upper tie plate, at least one deflector in substantial vertical registration with at least one part-length rod and disposed in the volume for deflecting flow of liquid laterally away from the volume and into the interstices of laterally adjacent fuel rods, enabling reduction in void fraction in the interstices, the deflector being releasably secured in the fuel bundle to enable access to and removal of the part-length fuel rod through the top of the fuel bundle.

Accordingly, it is a primary object of the present invention to provide novel and improved deflectors for the steam vent region of a nuclear reactor fuel bundle, enabling improved thermal hydraulic performance, while simultaneously reducing the void fraction about the full-length fuel rods and facilitating access to and removal of the part-length rods.

BEST MODE FOR CARRYING OUT THE INVENTION

Figure 1:
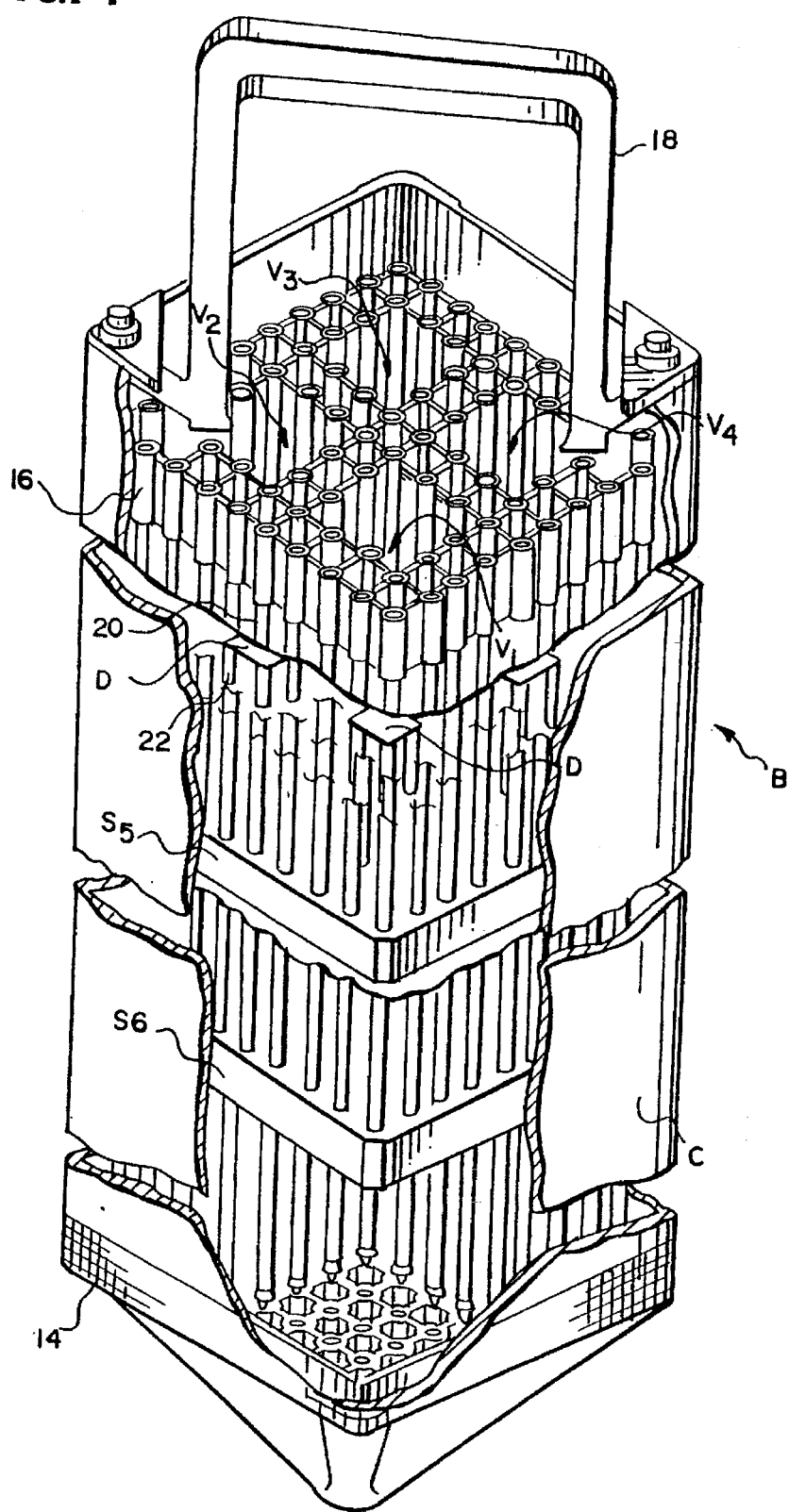
FIG. 1 is a fragmentary perspective view with parts broken out and in cross-section of a fuel bundle incorporating the present invention.

Referring now to the drawing figures, particularly to FIG. 1, there is illustrated a fuel bundle, generally designated B, including a plurality of full-length fuel rods 20 and part-length fuel rods 22. Full-length fuel rods 20 extend the full distance between a lower tie plate 14 and an upper tie plate 16. It will be appreciated that the part-length fuel rods 22 extend from the lower tie plate 14, terminating in the fuel bundle B short of the upper tie plate 16. A plurality of spacers are provided along the length of the fuel bundle, spacers S4 and S5 being illustrated. A channel C also surrounds the matrix of full and partial length fuel rods, as well as the spacers, for confining the liquid flow through the fuel bundle.

Figure 3:
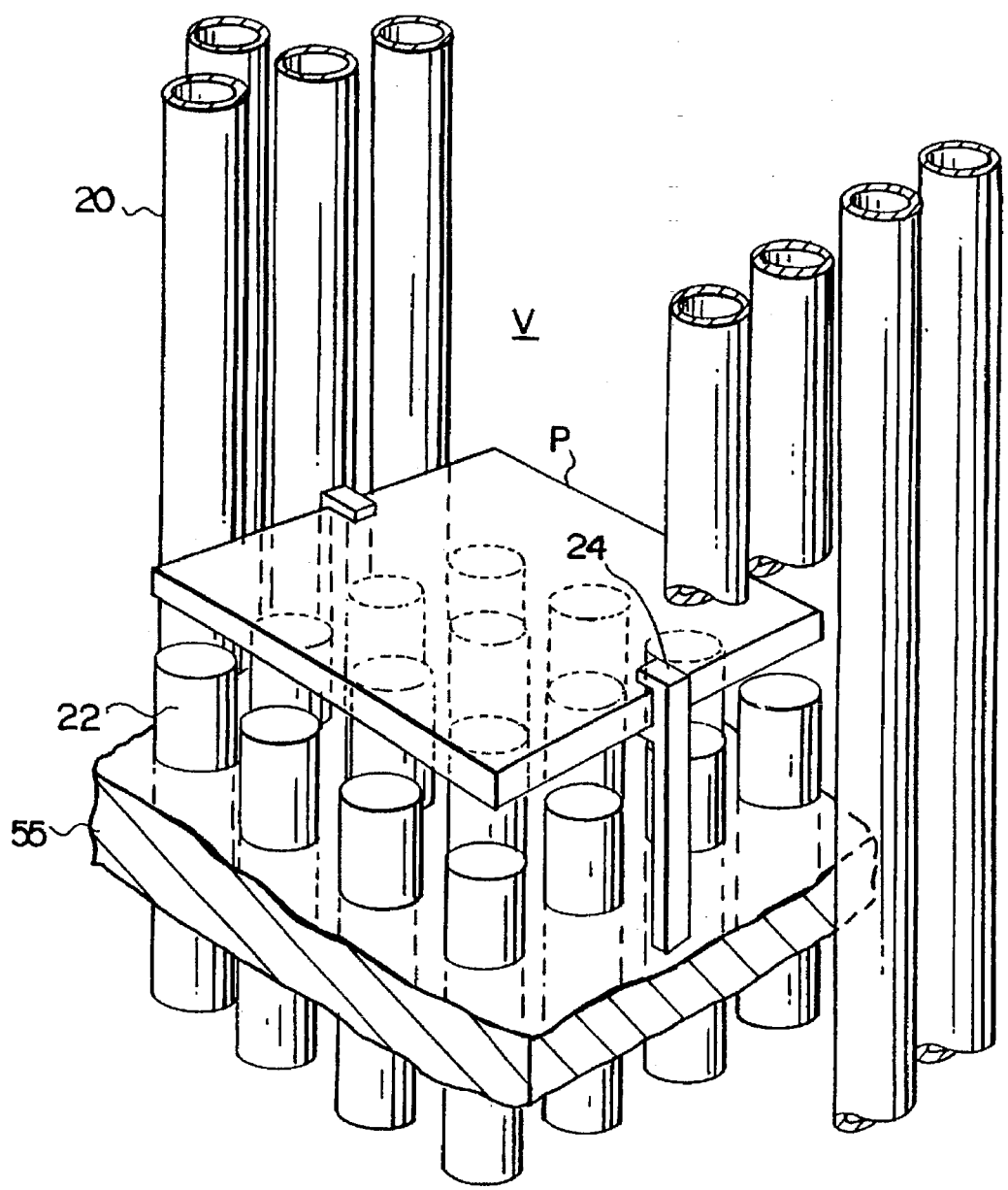
FIG. 3 is an enlarged fragmentary perspective view illustrating a steam vent region above part-length fuel rods with a deflector disposed in the fuel bundle according to another embodiment of the present invention.
Figure 4:
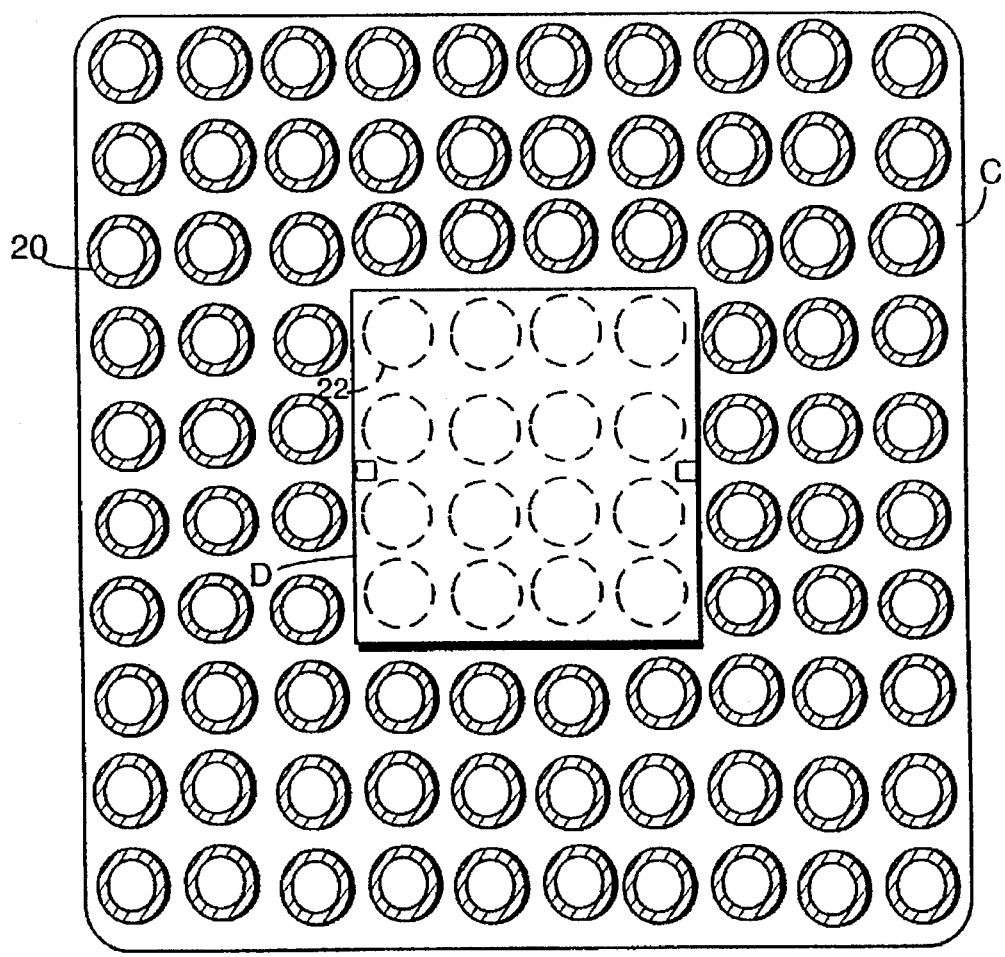
FIG. 4 is a cross-sectional view illustrating the location of the deflector of FIG. 3 in the fuel bundle.

It will be appreciated that the part-length fuel rods terminate shod of the upper tie plate to define one or more steam vent volumes between the part-length fuel rods and the upper tie plate. For example, four groups of part-length fuel rods 22 of four rods each are illustrated in FIG. 1 defining four steam vent volumes designated as V1–V4. While a 10×10 array of fuel rods is illustrated in FIG. 1, it will be appreciated that other arrays of fuel rods may be employed with the present invention, for example, a 9×9 array and that other combinations of part-length and full-length fuel rods at various locations within the fuel bundle can be provided. Additionally, deflectors D are illustrated in FIG. 1 at lateral and axial locations within the fuel bundle and above the groups of part-length fuel rods, respectively. It will be appreciated, however, that a single deflector D or string of deflectors can be used in the fuel bundle, for example, at a centrally located position as illustrated in the embodiment of FIGS. 3 and 4 where the part-length rods are disposed only in the central portion of the bundle.

Figure 2:
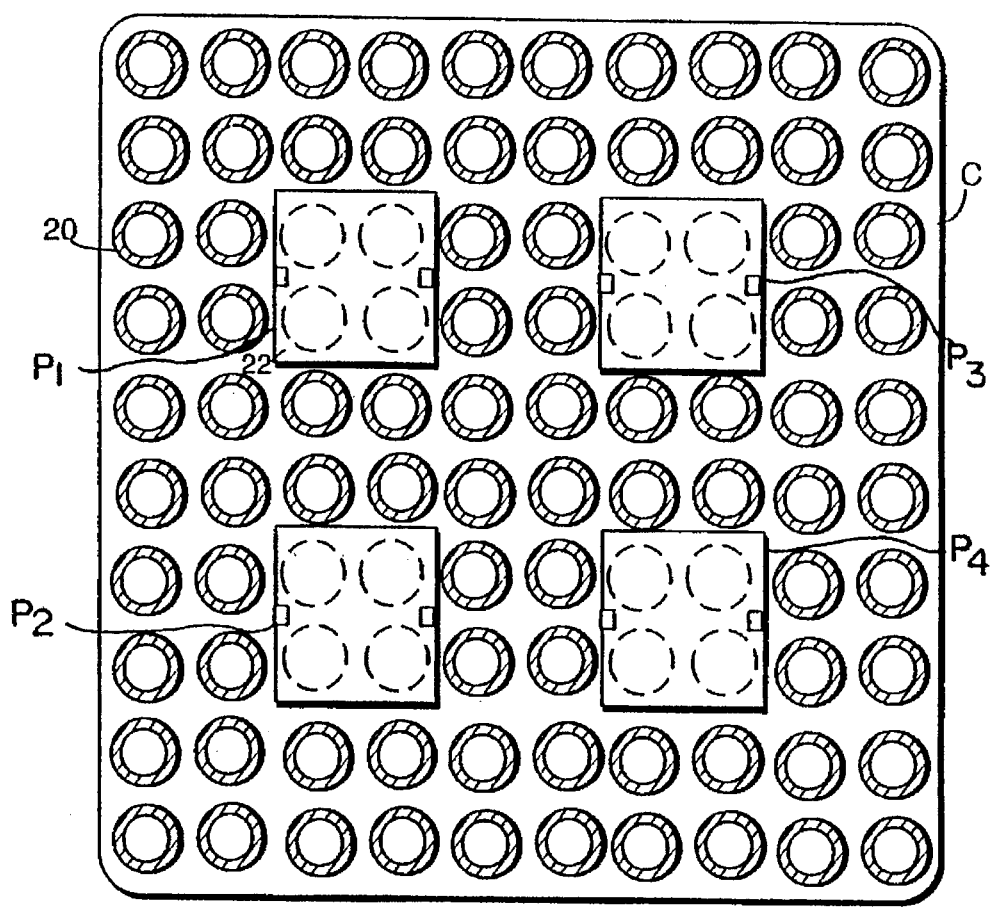
FIG. 2 is a horizontal cross-sectional view through the upper region of the fuel bundle illustrated in FIG. 1 illustrating the location of the deflectors in the fuel bundle lattice.
Figure 5:
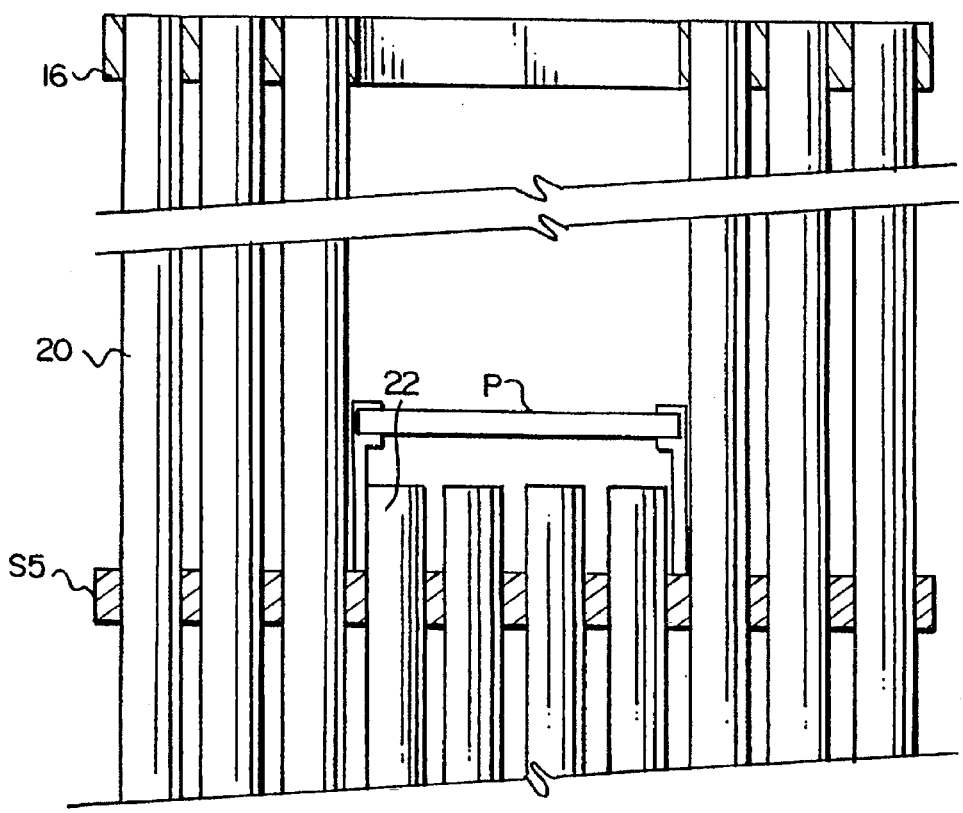
FIG. 5 is a side elevational view of the deflector illustrated in FIG. 2.

As illustrated in FIGS. 1 and 2, the part-length fuel rods may lie in groups of four such rods with deflectors D disposed above the upper ends of those groups of rods, respectively. As illustrated in FIGS. 3–5, the part-length fuel rods 20 may be centrally disposed within the fuel bundle, for example, in a 4×4 array, with surrounding fuel rods being symmetrically disposed about the part-length rods 20. Each steam vent region V above a group of part-length rods is thus void of nuclear material and forms a volume for venting steam upwardly within the bundle for flow out of the bundle, e.g., for driving a turbine to generate electricity.

It will be appreciated that improved critical power is obtained by maintaining high-density liquid in the interstices of the full-length fuel rods, particularly in the upper two-phase region of the nuclear fuel bundle including the region above the upper ends of the part-length rods. Thus, it is desirable to deflect liquid flowing upwardly within the fuel bundle into the interstices of the full-length rods, while simultaneously providing a path for steam to vent from the fuel bundle. To accomplish this in a fuel bundle employing part-length fuel rods, deflector D is disposed over the upper ends of the part-length rods 22 as illustrated in FIGS. 1–5. As will be seen in FIGS. 3 and 5, the part-length rods are supported in a spacer, for example, spacer S5, and terminate slightly above the spacer. The deflector D may be disposed just above and at distributed locations above the ends of the part-length rods 22 for deflecting liquid passing upwardly within the interstices of the part-length fuel rods 22 laterally outwardly into the interstices of the full-length fuel rods. By deflecting the liquid laterally, the liquid has a tendency to stay within the interstitial volumes of the full-length fuel rods, while the lower density steam may flow therefrom into the steam vent region V above deflector D for flow upwardly and out of the fuel bundle. To locate the deflector D in the fuel bundle, clips 24 are provided on the spacer S5 to maintain the deflector D in position to deflect the liquid laterally outwardly. The deflector D can be removed from the clips and the bundle, providing full access to the part-length rods 22. While the deflector can be releasably supported solely from a spacer, a structural support rod 32 provides support for the deflector 30 from the upper tie plate 16. In this manner, the deflector may be withdrawn through a correspondingly shaped opening in the upper tie plate to provide access to the part-length fuel rods. The deflector 30 may also be releasably supported by a combination of support rod 32 and clips releasably securing the deflector to the spacer.

In FIGS. 1 and 2, the deflectors D may comprise flat plates P1–P4 disposed over the upper ends of the groups of part-length fuel rods 22. The deflector plates P1–P4 likewise deflect fluid issuing from the interstices of the part-length fuel rods laterally outwardly into the interstices of the full-length fuel rods.

Figure 6:
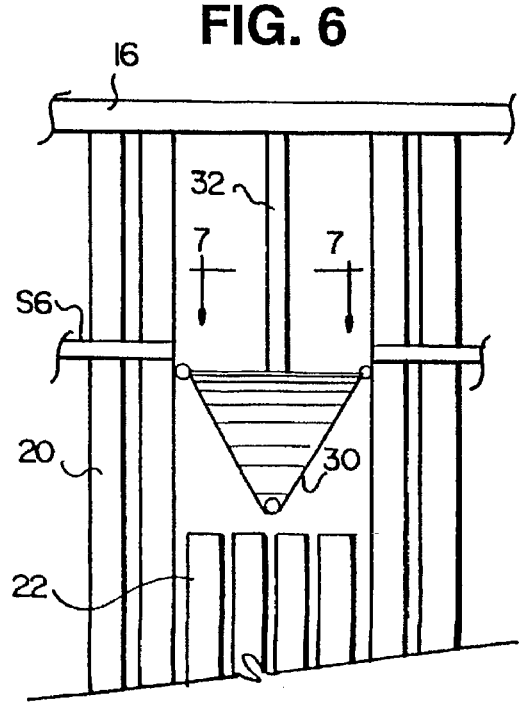
FIG. 6 is a schematic side elevational view of the upper steam vent region of a fuel bundle illustrating a further form of deflector.
Figure 7:
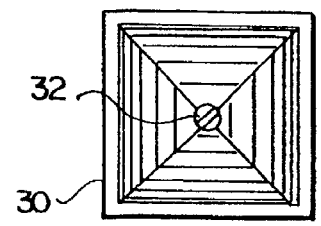
FIG. 7 is a cross-sectional view thereof taken generally about on lines 7—7 in FIG. 6.

Referring now to FIGS. 6 and 7, the deflector D may be configured other than as a flat plate, particularly to minimize the pressure drop and to improve liquid deflection effectiveness. For example, i FIGS. 6 and 7, a generally inverted pyramidal-shaped deflector 30 is disposed in the steam vent volume V above the upper ends of the part-length fuel rods 22. It will be appreciated that the steam vent volume V defined within the confines of surrounding full-length rods is essentially four-sided and, consequently, the pyramidal-shaped deflector 30 may be inverted and disposed within that rectilinear volume.

Figure 8:
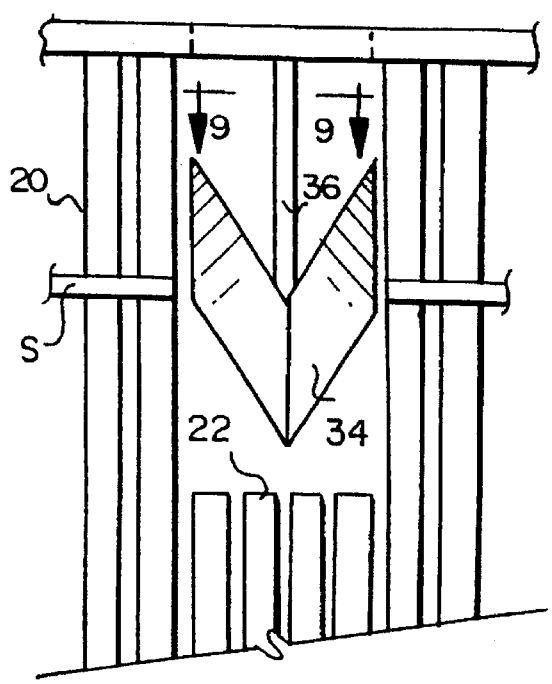
FIG. 8 is a schematic side elevational view of a further form of the deflector hereof.
Figure 9:
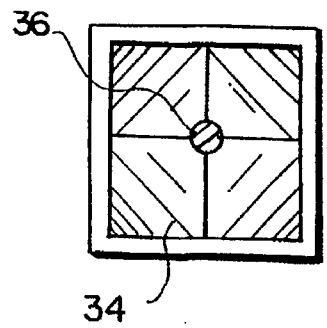
FIG. 9 is a cross-sectional view thereof taken generally about on lines 9—9 in FIG. 8.

In FIGS. 8 and 9, a similar inverted pyramidal-shaped deflector 34 is provided. However, the deflector 34 is rotated about a vertical axis about 45° (as compared with the deflector of FIG. 6 and 7) so that the flat triangular sides lie in opposition to the corners of the is rectilinear-shaped steam vent volume V. Thus, the generally triangular-shaped surfaces of deflector 34 are extended upwardly from their bases to fill in the corner areas of the steam vent volume V whereby the horizontally-projected area of the deflector 34 is substantially coextensive with the horizontal rectilinear area of the steam vent path. Liquid flowing upwardly from the interstices of part-length rods 22 is thereby deflected by the flat sides of the inverted deflector 34 into the volumes between the full-length fuel rods 20 to maintain a high density of liquid in that region. Again, the deflector 34 may be supported by a rod 36 depending from the upper tie plate, the deflector being centered with a spacer S, e.g., by clips or springs for easy removal through the upper tie plate.

Figure 10:
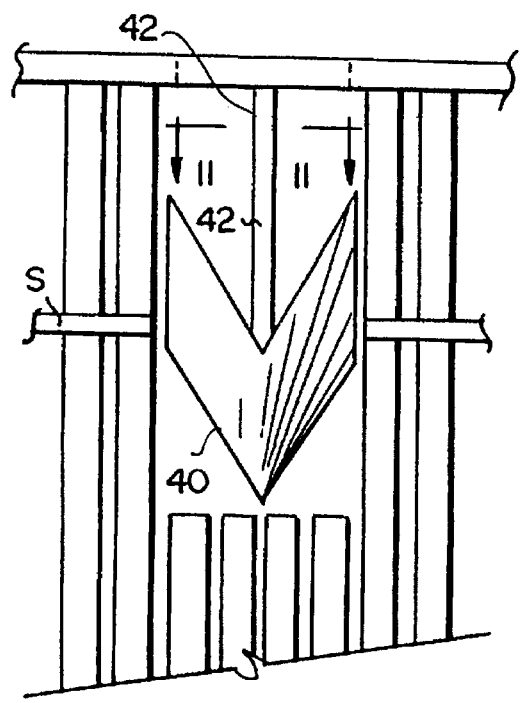
FIG. 10 is a schematic side elevational view of a still further form of deflector according to the present invention.
Figure 11:
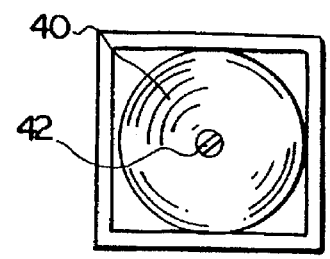
FIG. 11 is a cross-sectional view thereof taken generally about on lines 11—11 in FIG. 10.

In FIGS. 10 and 11, there is illustrated a generally inverted conical deflector 40 supported by a structural support rod 42 from the upper tie plate and centered by the spacer similarly as in the preceding embodiment. It will be appreciated that because the steam vent volume is generally square in cross-sectional configuration, the conical deflector 40 extends upwardly into the corners of the steam vent volume as illustrated. That is, the conical-shaped surface of deflector 40 is extended upwardly from its full circular base (corresponding in diameter to the width of the steam vent volume) to fill in the corner areas of the steam vent volume V whereby the horizontally projected area of the deflector 40 is substantially coextensive with the rectilinear area of the steam vent path. This inverted conical deflector affords a substantial uniform distribution of liquid into the interstices of the full-length rods.

Figure 12:
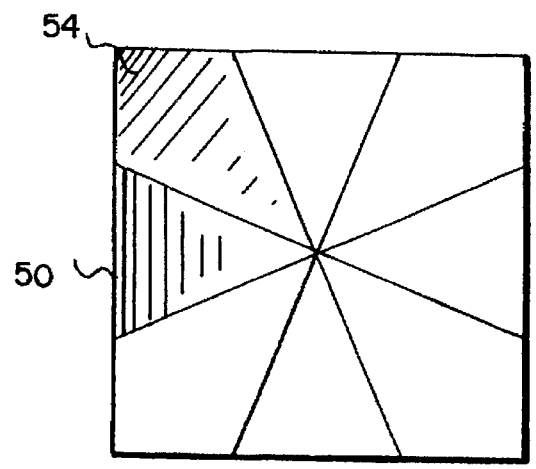
FIG. 12 is a top view of a further embodiment of deflector plate thereof.
Figure 13:
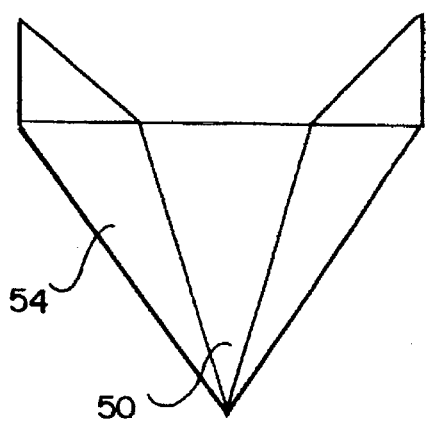
FIG. 13 is a side elevational view of the deflector plate of FIG. 12.
Figure 14:
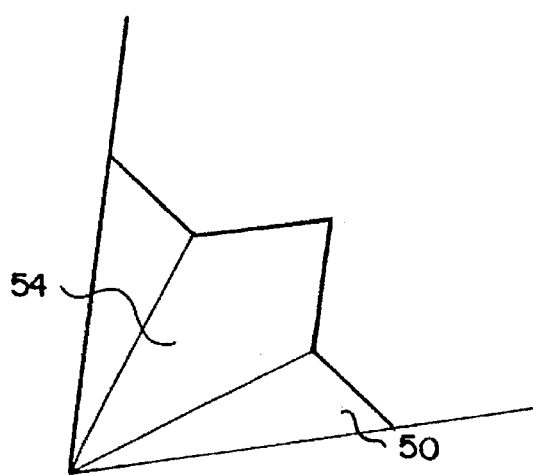
FIG. 14 is a side view of the deflector plate of FIG. 13 and rotated 45°.

As illustrated in FIGS. 12–14, an eight-sided pyramidal-shaped deflector 50 is provided. In this configuration, four of the flat areas 54 of the eight-sided pyramidal-shaped deflector can be disposed in opposition to the four corners, respectively, of the steam vent volume and extended upwardly beyond the base of the pyramid such that the entire cross-sectional area of the steam vent volume is occupied by portions of deflector 50. Thus, the horizontally projected area provided by deflector 50 is substantially coextensive with the horizontal rectilinear area of the steam vent path.

Figure 15:
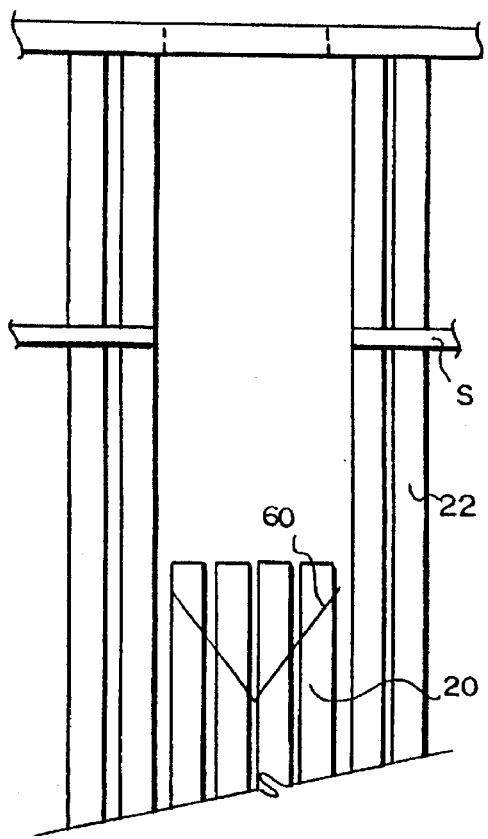
FIG. 15 is a schematic side elevational view of the steam vent region of the fuel bundle illustrating a further form of deflector according to the present invention.

Referring to FIG. 15, an inverted pyramidal or conical deflector 60 is provided with openings in registration with the part-length fuel rods. In this form, the inverted pyramid deflector is disposed at a location lower than the upper ends of the part-length fuel rods by receiving the part-length fuel rods through the respective registering openings. Consequently, the upwardly flowing liquid is deflected outwardly of the interstices of the part-length fuel rods and into the interstices of the full-length fuel rods prior to reaching the level of the upper ends of the part-length rods.

Figure 16:
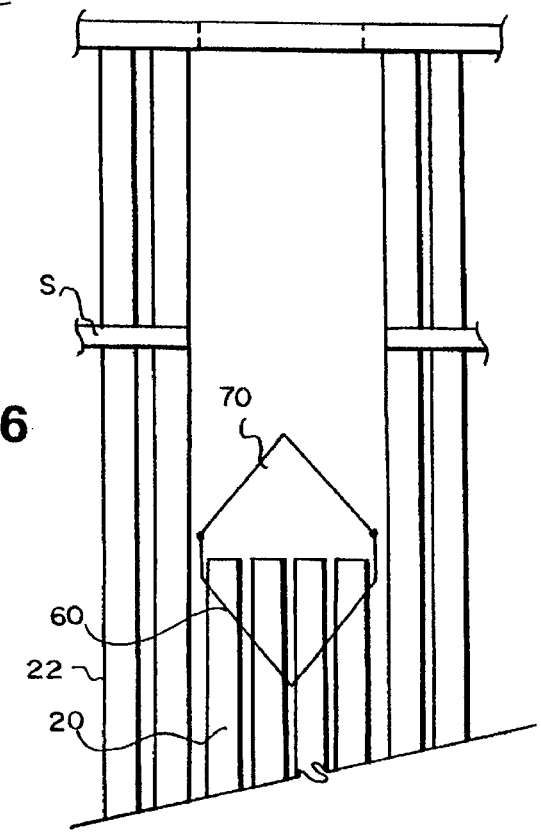
FIG. 16 is a view similar to FIG. 15 illustrating a still further form of the deflector of the present invention.

Referring to FIG. 16, a cover or lid 70 may be disposed over the deflector plate 60 illustrated in FIG. 15. The cover is in a symmetrical form relative to the inverted deflector. For example, it may comprise an upstanding pyramid corresponding in shape to the inverted pyramidal deflector 60, thereby assisting in reducing the pressure drop across the deflector.

Figure 17:
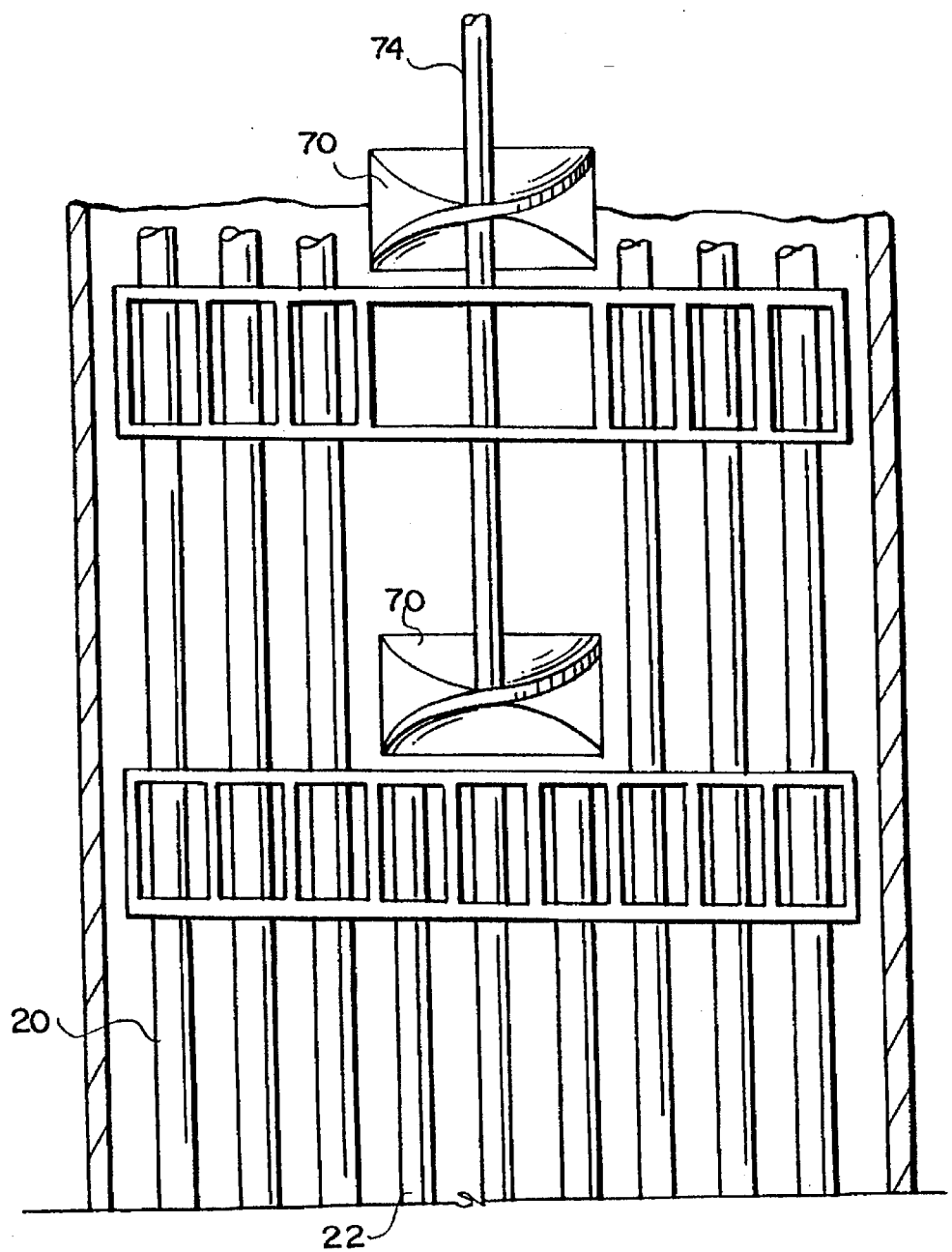
FIG. 17 is a side elevational view with two swirl deflectors positioned above spacers, and a support rod for mounting and removing the deflectors.

Referring to FIG. 17, a swirl deflector is provided. In this configuration, swirl segments 70 are positioned just above one or more of the spacers and overlay the part-length fuel rods 22. A support rod 74 is also provided to mount and remove the swirl deflectors through the upper end of the fuel bundle.

In all forms of deflector, the deflector is removable from the bundle or otherwise releasable to a position enabling access to and removal of the part-length rods from the bundle.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel bundle for boiling water reactors comprising:

a plurality of vertically aligned, laterally spaced-apart fuel rods within said fuel bundle for generation of a fission reaction in the presence of water moderator;

a lower tie plate for admitting water moderator through said lower tie plate to the interstices of said fuel rods and supporting said vertically aligned, spaced-apart fuel rods;

an upper tie plate for enabling water and steam to be discharged from the top of the fuel bundle and maintaining said vertically aligned, spaced-apart fuel rods in upstanding, spaced-apart, side-by-side relation;

a plurality of spacers vertically spaced from one another between said upper and lower tie plates for maintaining said fuel rods laterally spaced from one another;

a surrounding fuel channel for confining moderator flow along the fuel rods and from said lower tie plate to said upper tie plate;

at least one of said fuel rods being a part-length rod extending vertically from the lower tie plate and terminating short of the upper tie plate wherein the upper end of said one part-length rod defines with respect to the surrounding fuel rods a volume overlying said part-length rod under said upper tie plate;

at least one deflector in substantial vertical registration with said at least one part-length rod and disposed in said volume for deflecting flow of liquid laterally away from said volume and into the interstices of laterally adjacent fuel rods, enabling reduction in void fraction in said interstices;

a support for said deflector connected between at least one of said upper tie plate and said spacers for releasably securing said deflector to said fuel bundle enabling access to and removal of said part-length fuel rod through the top of said fuel bundle upon removal of said deflector.

2. A fuel bundle according to claim 1 wherein the fuel bundle includes a plurality of part-length rods spaced laterally one from another and lying within a group of said part-length rods terminating short of said upper tie plate to define a volume between said group of said part-length rods and said upper tie plate, said deflector lying in substantial vertical registration with said group of said part-length rods for deflecting flow of moderator laterally away from said volume above said part-length rods.

3. A fuel bundle according to claim 1 wherein the fuel bundle includes groups of part-length rods each comprised of at least one part-length rod spaced laterally from said full-length fuel rods and with said full-length fuel rods lying laterally between said groups of part-length rods and defining volumes between said groups of part-length rods and said upper tie plate, respectively, at least one deflector in substantial vertical alignment with said at least one part-length rod of each group for deflecting flow of moderator laterally away from said volumes and into the interstices of adjacent full-length rods, enabling a reduction in the void fraction in said interstices.

4. A fuel bundle according to claim 1 wherein said deflector comprises an inverted cone.

5. A fuel bundle according to claim 1 wherein said deflector comprises an inverted surface having a plurality of triangularly-shaped flat surfaces about a vertical axis through an apex thereof.

6. A fuel bundle according to claim 1 wherein said deflector comprises a device for swirling the moderator flow above the part-length fuel rod.

7. A fuel bundle according to claim 1 wherein said fuel rods form a rectilinear matrix in the bundle with each fuel rod having a circular cross-section, said volume having a rectilinear shape in horizontal cross-section and defined in part by portions of fuel rods adjacent said one part-length fuel rod and lying above said one part-length fuel rod, said deflector having a vertical extent within the fuel bundle and a shape such that a horizontal projected area thereof is substantially coextensive with the horizontal cross-sectional area of said volume.

8. A fuel bundle according to claim 7 wherein said deflector comprises a multi-sided inverted pyramid.

9. A fuel bundle according to claim 7 wherein said deflector comprises an inverted cone.

10. A fuel bundle according to claim 7 wherein said deflector comprises a device for swirling the moderator flow above the part-length fuel rod.

11. A fuel bundle according to claim 1 including a support extending from said upper tie plate for supporting said deflector within said bundle.

12. A fuel bundle according to claim 1 wherein said deflector is disposed in close-spaced relation above an upper end of said one part-length fuel rod and said volume is substantially void of fuel rods and other structural elements of said fuel bundle.

13. A fuel bundle for boiling water reactors comprising:
a plurality of vertically aligned, laterally spaced-apart fuel rods within said fuel bundle for generation of a fission reaction in the presence of water moderator;
a lower tie plate for admitting water moderator through said lower tie plate to the interstices of said fuel rods and supporting said vertically aligned, spaced-apart fuel rods;
an upper tie plate for enabling water and steam to be discharged from the top of the fuel bundle and maintaining said vertically aligned, spaced-apart fuel rods in upstanding, spaced-apart, side-by-side relation;
a plurality of spacers vertically spaced from one another between said upper and lower tie plates for maintaining said fuel rods laterally spaced from one another;
a surrounding fuel channel for confining moderator flow along the fuel rods and from said lower tie plate to said upper tie plate;
at least one of said fuel rods being a part-length rod extending vertically from the lower tie plate and terminating short of the upper tie plate wherein the upper end of said one part-length rod defines with respect to the surrounding fuel rods a volume overlying said part-length rod under said upper tie plate;
at least one deflector extending below the upper end of said part-length fuel rod and in substantial vertical registration with said volume for deflecting flow of liquid laterally away from said volume and into the interstices of laterally adjacent fuel rods, enabling reduction in void fraction in said interstices;
a support for said deflector connected between at least one of said upper tie plate and said spacers for releasably securing said deflector to said fuel bundle enabling access to and removal of said part-length fuel rod through the top of said fuel bundle upon removal of said deflector.

14. A fuel bundle for boiling water reactors comprising:
a plurality of vertically aligned, laterally spaced-apart fuel rods within said fuel bundle for generation of a fission reaction in the presence of water moderator;
a lower tie plate for admitting water moderator through said lower tie plate to the interstices of said fuel rods and supporting said vertically aligned, spaced-apart fuel rods;
an upper tie plate for enabling water and steam to be discharged from the top of the fuel bundle and maintaining said vertically aligned, spaced-apart fuel rods in upstanding, spaced-apart, side-by-side relation;
a plurality of spacers vertically spaced from one another between said upper and lower tie plates for maintaining said fuel rods laterally spaced from one another;
a surrounding fuel channel for confining moderator flow along the fuel rods and from said lower tie plate to said upper tie plate;
at least one of said fuel rods being a part-length rod extending vertically from the lower tie plate and terminating short of the upper tie plate wherein the upper end of said one part-length rod defines with respect to the surrounding fuel rods a volume overlying said part-length rod under said upper tie plate;
at least one deflector including an opening for receiving an upper end portion of said one part-length rod whereby said deflector extends below the upper end of said one part-length rod, said deflector being disposed in substantial vertical registration with said volume for deflecting flow of liquid laterally away from said volume and into the interstices of laterally adjacent fuel rods, enabling reduction in void fraction in said interstices;
a support for said deflector connected between at least one of said upper tie plate and said spacers for releasably securing said deflector to said fuel bundle enabling access to and removal of said part-length fuel rod through the top of said fuel bundle upon removal of said deflector.

* * * * *